United States Patent [19]

Hasegawa et al.

[11] Patent Number: 4,650,517

[45] Date of Patent: Mar. 17, 1987

[54] METHOD OF HEATING MOLTEN STEEL BY ARC PROCESS

[75] Inventors: Teruyuki Hasegawa, Yokohama; Seigo Kuwano, Tokyo; Ryuji Yamaguchi; Kazuhiko Matsuo, both of Yokohama, all of Japan

[73] Assignee: Nippon Kokan Kabushiki Kaisha, Tokyo, Japan

[21] Appl. No.: 868,807

[22] Filed: May 29, 1986

[30] Foreign Application Priority Data

May 29, 1985 [JP] Japan ............................ 60-115940
May 29, 1985 [JP] Japan ............................ 60-115942
May 29, 1985 [JP] Japan ............................ 60-115943
Jun. 5, 1985 [JP] Japan ............................ 60-121731

[51] Int. Cl.$^4$ ............................................. C22B 4/00
[52] U.S. Cl. .................................... 75/10.45; 75/10.61
[58] Field of Search ................ 75/10.45, 10.61, 59.2, 75/59.22

[56] References Cited

U.S. PATENT DOCUMENTS

3,708,599  1/1973  Krause .......................... 219/59.2
3,854,932  12/1974  Bishop ........................... 75/59.22

Primary Examiner—Peter D. Rosenberg
Attorney, Agent, or Firm—Frishauf, Holtz, Goodman & Woodward

[57] ABSTRACT

Three electrodes are dipped into slag on molten steel in a ladle. The electrodes are connected to a three-phase AC voltage. An arc is formed between each electrode and molten steel upon energizing the electrodes. The molten steel is heated by arc heat. Each electrode has a gas flow path extending longitudinally along its center. The gas flow path is open at the lower end of each electrode to constitute a gas injection port. Ar gas is injected from the gas injection port through the gas flow path. Nitrogen is removed from the arc region between the electrodes and the molten steel and its peripheral region to prevent the nitrogen pickup phenomenon of molten steel. If a powder mixture of chromium ore and carbon is added to the Ar gas, chromium ore is reduced by carbon with arc heat to add reaction product of chromium to the molten steel. If a flux powder is added to the Ar gas, the flux is melted and slagged by the arc heat.

8 Claims, 12 Drawing Figures

METHOD OF HEATING MOLTEN STEEL BY ARC PROCESS

BACKGROUND OF THE INVENTION

The present invention relates to a method of heating molten steel by an arc process, wherein an arc is formed between molten steel and electrodes dipped in slag on molten steel contained in a ladle.

By using an arc process to heat molten steel after converter refining, the converter tap temperature of the molten steel can be decreased, thereby leading to a decrease in the required amounts of converter refractory and auxiliary materials. The yield of molten steel tapped from the converter can thus be increased.

In order to perform the arc process, molten steel is tapped from a converter into a ladle, and carbon electrodes are dipped into slag on the molten steel. An arc is formed between the molten steel and each electrode while the electrodes are surrounded by the slag.

If nitrogen gas is, however, present in the ladle during arc heating, it is absorbed by the molten steel, increasing the nitrogen concentration [N] in molten steel, thus causing the nitrogen pickup phenomenon. In order to prevent this nitrogen pickup phenomenon, argon gas is blown into the ladle or into work holes into the cover of a conventional ladle, thereby sealing the molten steel off from any nitrogen gas present.

Using this conventional sealing method, however, it takes about an hour to seal the molten steel off from the nitrogen gas. In addition, in order to completely prevent the nitrogen pickup phenomenon, the argon gas must be provided at a high flow rate, e.g., of about 300 Nm$^3$/h. Furthermore, sealing degrades the efficiency of the arc process, and the large amount of argon gas required increases the total process cost.

SUMMARY OF THE INVENTION

It is the object of the present invention to provide a method of heating molten steel by an arc process, wherein the nitrogen pickup phenomenon of molten steel can be prevented without using a large amount of inert gas.

In order to achieve the above object of the present invention, there is provided a method of heating molten steel by an arc process, comprising the steps of: dipping a lower end portion of an electrode into slag on molten steel contained in a ladle; energizing the electrode to form an arc between the electrode and the molten steel, the electrode having a gas injection port formed at the lower end thereof, a gas inlet port at the upper portion thereof, and a gas flow path connecting the gas injection port with the gas inlet port; and supplying an inert gas from a gas supply means to the gas inlet port of the electrode and injecting the inert gas from the gas injection port through the gas flow path.

The present inventors have made extensive studies of the molten steel nitrogen pickup mechanism during the arc process, and have discovered the following facts: when nitrogen is present in an arc region between an electrode and the molten steel, nitrogen gas molecules (N$_2$) are activated as a plasma by the arc heat; atomic nitrogen (N) is thereby produced in the active region, and is absorbed by the molten steel, causing the nitrogen pickup phenomenon.

It is important to eliminate nitrogen from the arc region in order to prevent the nitrogen pickup phenomenon. According to the present invention, since an inert gas, such as Ar gas, is injected from the lower ends of the electrodes to fill the arc region and its periphery with the inert gas, nitrogen gas can be eliminated therefrom, effectively preventing the activation of the nitrogen gas and thereby preventing the nitrogen pickup phenomenon.

DETAILED DESCRIPTION OF THE PREFERRED EMBODIMENTS

Figure 1:
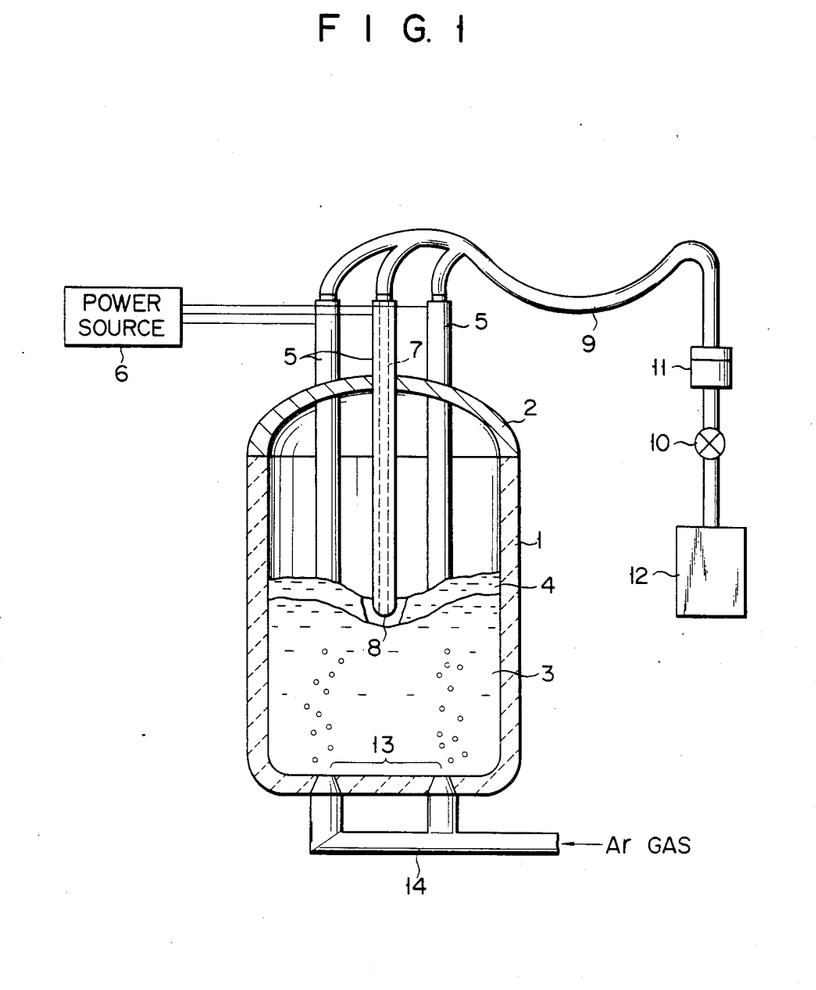
FIG. 1 is a sectional view of a ladle for explaining a method of heating molten steel according to an embodiment of the present invention.

As shown in FIG. 1, molten steel 3 tapped from a converter is contained in ladle 1. Three electrodes 5 are charged in the ladle through holes formed in cover 2 thereof. The lower end portions of electrodes 5 are dipped into slag 4 on molten steel 3. Electrodes 5 are made of carbon material. Each electrode 5 charged in ladle 1 is connected to three-phase AC power source 6. Gas flow paths 7 (illustrated for only one electrode) formed in electrodes 5 along their longitudinal direction. Paths 7 are open at the upper and lower ends of electrodes 5. The lower opening of each electrode 5 constitutes gas injection port 8. The upper end of each electrode 5 is connected to hose 9, which is coupled to an appropriate inert gas source, such as Ar gas source 12. Gas flow control valve 10 and flow meter 11 are inserted midway along hose 9.

Porous plugs 13 are mounted in the bottom surface of ladle 1. Plugs 13 are connected to pipe 14, which is also coupled to an Ar gas source (not shown). Inert gas (Ar gas), to stir the molten steel 3, is supplied through plugs 13.

In the arc process performed by the arrangement described above, molten steel 3 is tapped from the converter into ladle 1 and electrodes 5 are dipped into slag 4 on molten steel 3. Electrodes 5 are energized to form an arc between electrodes 5 and molten steel 3, thereby heating molten steel 3 with the arc. During arc heating, Ar gas is injected from ports 8 at the lower ends of electrodes 5 at a flow rate of 21 Nm$^3$/h (350 N l/min) to fill the arc region with Ar gas. In other words, the inert (Ar) gas is injected from ports 8 of electrodes 5 to fill the arc region with the inert gas, so as to eliminate nitrogen gas from there. Nitrogen gas is therefore not activated, effectively preventing the nitrogen pickup phenomenon.

Since Ar gas is injected from ports 8 at the lower ends of electrodes 5 toward molten steel 3, molten steel 3 and slag 4 are stirred well, accelerating a desired reaction therebetween. If slag 4 has a desulfurization function, its effect can be accelerated by the injection of Ar gas from electrodes 5. In addition, by stirring the molten steel and slag, the slag is not heated to an abnormally high temperature. Therefore, the injection of Ar gas from plugs 13 at the bottom of ladle 1 to stir molten steel 3 can be performed, but is not strictly necessary.

Figure 2:
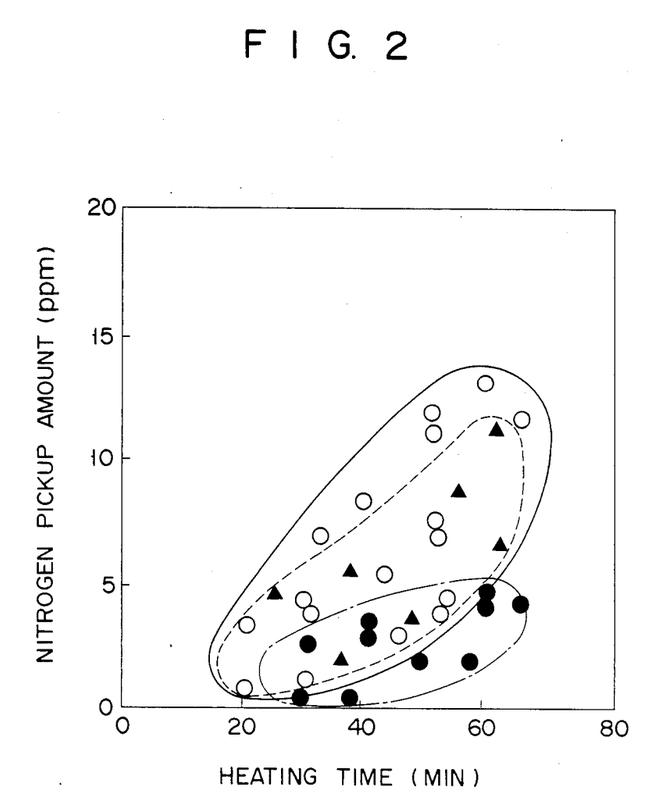
FIG. 2 is a graph showing the relationship between an Ar gas flow rate and the resultant amount of a nitrogen pickup.

FIG. 2 shows the effect of the hollow electrodes which decrease the amount of nitrogen pickup. The process time (energizing time) of the arc process is plotted along the abscissa and the nitrogen pickup amount (ppm) is plotted along the ordinate. The graph in FIG. 2 shows increments in nitrogen concentration in molten steel. White dots represent increments when conventional solid electrodes are used. Black dots and triangles represent increments when Ar gas is injected from the gas injection ports of the hollow electrodes. More specifically, the Ar gas flow rate is 18 $Nm^3/h$ or more for the black dots and less than 18 $Nm^3/h$ for the black triangles. As is apparent from FIG. 2, the nitrogen pickup amount tends to increase as the process time is prolonged. When the Ar gas flow rate is 18 $Nm^3/h$, the nitrogen pickup amount is 5 ppm or less, compared to a maximum of 14 ppm for the conventional solid electrodes (the region surrounded by the solid line). However, when the Ar gas flow rate is less than 18 $Nm^3/h$ (the region surrounded by the broken line), the nitrogen pickup amount is increased in relation to the prolongation of the process time, and the nitrogen concentration range is undesirably wide.

Molten steel tapped from a 290-ton converter was arc-heated using an Ar gas flow rate of 18 $Nm^3/h$ through hollow electrodes, each having a gas flow path diameter of 20 mm. The nitrogen concentration prior to arc heating was 30 ppm, and arc-heated molten steel contained 33 ppm of nitrogen. Therefore, the nitrogen pickup amount could be decreased to 3 ppm.

Figure 3:
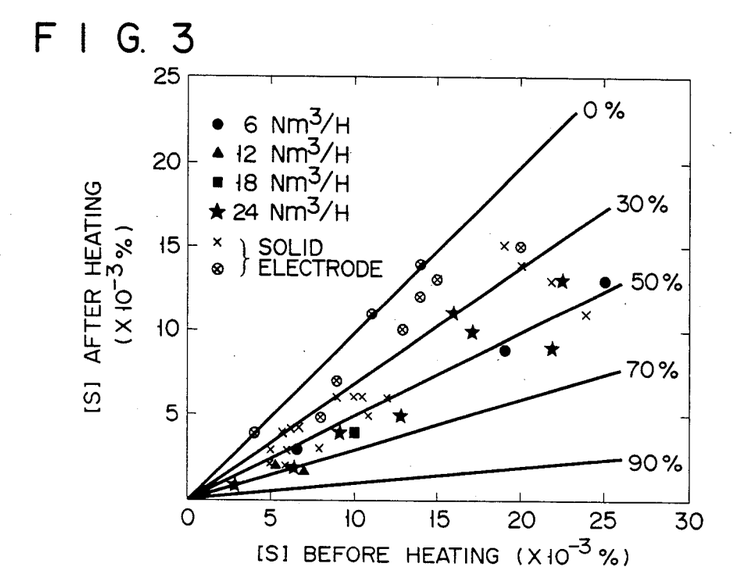
FIGS. 3 and 4 are graphs showing the desulfurization effect of the embodiment of FIG. 1.
Figure 4:
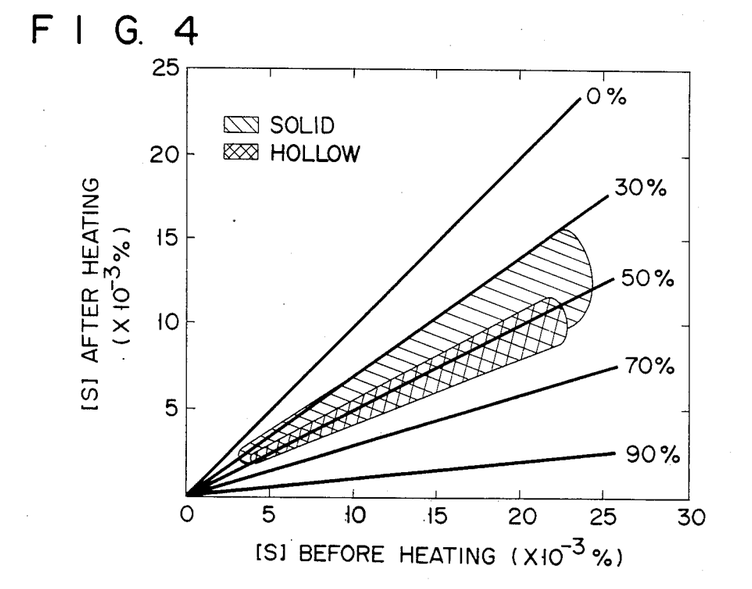

FIG. 3 is a graph obtained when Ar gas is injected through electrodes 5 to stir slag 4 and molten steel 3 addition to Ar injection from plugs 13 at the bottom of ladle 1. The concentration of sulfur [S] in the molten steel prior to this process is plotted along the abscissa and that after the process is plotted along the ordinate. The results, using hollow electrodes, are compared with those using solid electrodes. When hollow electrodes were used, Ar gas flow rates for each electrode were 6, 12, 18, and 24 $Nm^3/h$. The sulfur concentrations obtained by using the conventional solid electrodes are also plotted for reference. A hatched region in FIG. 4 shows a case wherein deoxidized molten steel was stirred by gas supplied from plugs 13 at the bottom of ladle 1. A crosshatched region in FIG. 4 shows a case wherein molten steel was stirred by the gas from plugs 13 at the bottom of ladle 1 as well as gas provided through electrodes 5. When Ar gas was injected into molten steel through only the porous plugs 13 at the bottom of ladle 1, the desulfurization rate was about 50%. However, as indicated by the crosshatched region in FIG. 4, the desulfurization rate using the hollow electrodes of the first embodiment was about 60%. In this case, the total content of aluminum in the deoxidized molten steel was 0.025% or more. As is apparent from this graph, the desulfurization effect on molten steel, upon injection of the inert gas from the hollow electrodes, can be improved.

According to this embodiment, since Ar gas supplied through the hollow electrodes stirs the molten steel and slag, the slag temperature is not higher than that of the molten steel. However, with conventional solid electrodes, in order to prevent slag from being heated to an abnormally high temperature by arc heat, 15 minutes after energizing the solid electrodes, energizing was stopped for 1 to 2 minutes (performing only bubbling of the molten steel) to allow the slag to cool. When the slag had cooled, energizing was resumed. However, according to this embodiment, continuous energizing can be achieved. Although the conventional arc heating cycle requires about 40 minutes, the process time was shortened to about 30 minutes using the structure of this embodiment.

The inert gas above is exemplified by Ar gas, but can also be xenon (Xe) gas or the like.

In the above embodiment, only one gas flow path is formed in each hollow electrode. However, a plurality of gas flow paths of a small diameter may be formed. Alternatively, a plurality of gas injection holes connected with the gas flow path may be formed at the distal end of each electrode.

A second embodiment of the present invention will be described below.

Slag thickness at the start of arc heating is usually about 30 mm. In this state, in order to decrease the nitrogen pickup rate in molten steel to 0.04 ppm/min or less, Ar gas must be injected from ports 8 of electrodes 5 at a flow rate of 350 Nl/min for each electrode. However, during the arc process, arc heating progresses at the same time as a flux is added to molten steel to refine the molten steel with the slag. For this reason, the thickness of slag 4 on molten steel 3 is increased over time. When the slag thickness is increased, a bare molten steel region, formed by eliminating slag through arcs formed between the electrodes and the molten steel, is decreased. In other words, the slag region covering the molten steel is increased. The molten steel surface area subjected to permeation of nitrogen molecules or atoms is thus decreased. When the slag thickness is increased, the flow rate of Ar gas injected through gas injection ports 8 to prevent the nitrogen pickup phenomenon can be decreased.

Figure 5:
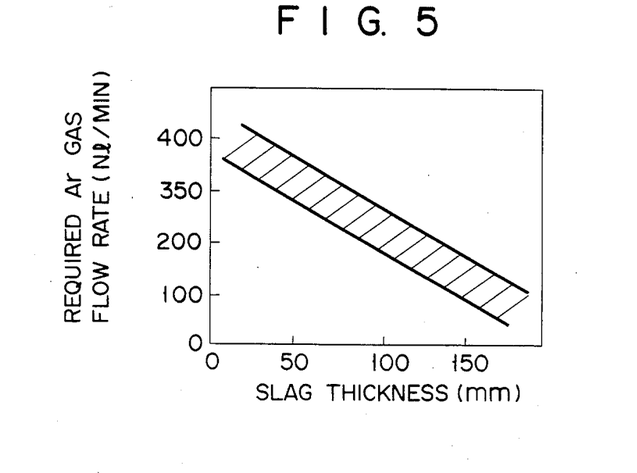
FIG. 5 is a graph showing the relationship between slag thickness and the Ar gas flow rate required to achieve a nitrogen pickup rate of 0.04 ppm/min.

FIG. 5 is a graph obtained by plotting Ar gas flow rate as a function of slag thickness when the molten steel nitrogen pickup rate is 0.04 ppm/min. As is apparent from FIG. 5, when the slag thickness is increased, the Ar gas flow rate is decreased. When the slag thickness is 140 mm or 160 mm, the Ar gas flow rate for keeping the nitrogen pickup rate at 0.04 ppm/min is 150 Nl/min or 100 Nl/min.

According to this embodiment, the flow rate of Ar gas injected from hollow electrodes 5 can be decreased as the slag thickness on the molten steel increases, thereby preventing excess consumption of Ar gas. The slag thickness can be continuously measured by an eddy current sensor. On the other hand, a probe rod may be inserted in slag prior to arc heating to measure the slag thickness by measuring the length of a portion of the slag that becomes attached to the probe rod. After the slag is charged in the ladle, an increment of slag thickness upon melting of the flux is calculated from the weight of the flux charged in the ladle. This increment is added to the original slag thickness to obtain a total slag thickness.

On the basis of the obtained slag thickness, the Ar gas flow rate can be automatically controlled using a microcomputer or the like. Alternatively, flow meter 11 can perform monitoring, on the basis of the relationship shown in FIG. 5, to control the opening of valve 10 and thereby correct Ar gas flow rate.

Figure 6:
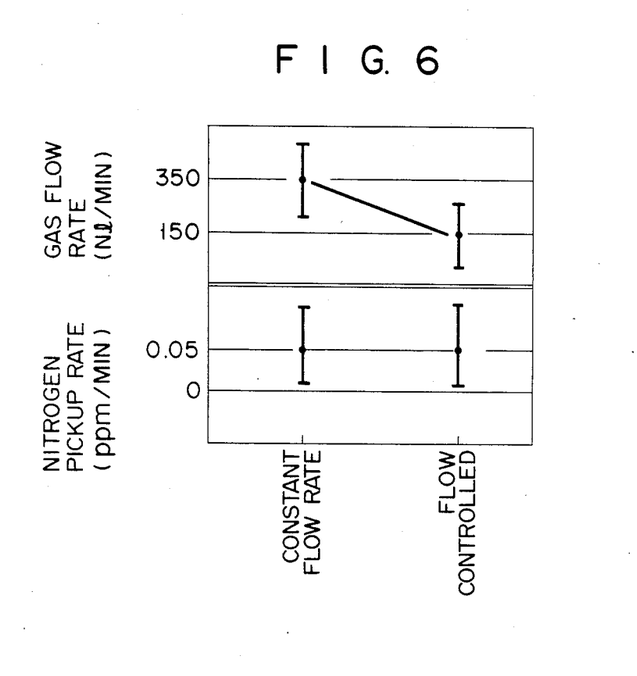
FIG. 6 is a graph showing the effect of a second embodiment of the present invention.

As described above in detail, the maximum flow rate of Ar gas injected from each hollow electrode is 350 Nl/min. Compared to the case where the interior of the ladle is sealed with Ar gas, as in the conventional method (300 $Nm^3/h$ or 5,000 Nl/min), the Ar gas flow rate can be greatly decreased. In addition, the flow rate of Ar gas injected from the hollow electrodes is sequentially decreased as slag thickness increases. As shown in FIG. 6, in setting the nitrogen pickup amount in this embodiment (through flow rate control) to 0.05 ppm/min or less, the average flow rate of Ar gas can be reduced to 150 Nl/min. Compared to the constant Ar gas flow rate (350 Nl/min), Ar gas consumption can thus be decreased. In other words, the Ar gas flow rate can be decreased to 3% of that of the conventional method.

In the arc process of this embodiment, since the arc region is covered with inert gas during formation of arcs between the molten steel and the electrodes, the nitrogen pickup phenomenon of molten steel can be effectively prevented even if the amount of inert gas is small. In addition, the flow rate of the inert gas can be decreased upon an increase in slag thickness, thereby preventing excess use of the inert gas and thus decreasing inert gas consumption.

A third embodiment of the present invention is described in detail below. In this embodiment, a powder mixture of chromium ore and carbon material is carried in Ar gas and is sprayed through electrodes to add chromium to molten steel.

According to the conventional method of adding chromium to molten steel, chromium ore is charged in molten steel tapped into a ladle. Aluminum (Al) or silicon (Si), used as a reducing agent, is also added to the molten steel. The temperature of the molten steel is then increased to react chromium ore ($Cr_2O_3$) with Al or Si, thereby adding reaction product of chromium to the molten steel.

Since Al or Si added as the reducing agent of chromium ore is relatively expensive, the resultant steel is also expensive. The third embodiment can also solve this conventional problem.

The third embodiment of the present invention will be described with reference to the accompanying drawings. The same reference numerals in FIG. 7 denote the same parts as in FIG. 1, and a detailed description thereof will be omitted.

Figure 7:
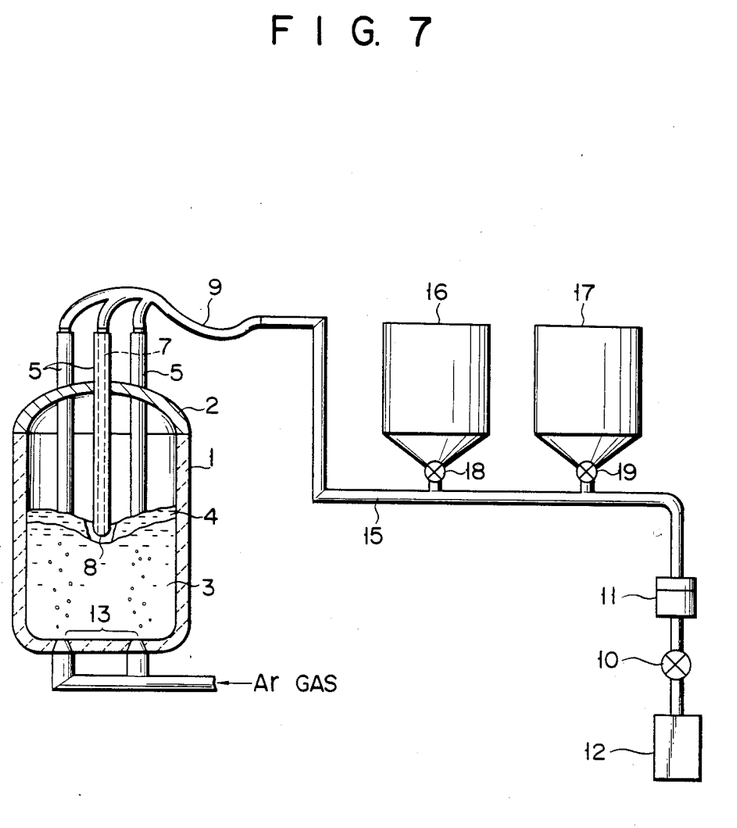
FIG. 7 is a schematic view showing a third embodiment of the present invention.

One end of hose 9 is connected to the upper end of electrode 5. The other end of hose 9 is connected to pipe 15 for supplying chromium ore and carbon material as a reducing agent together with a carrier gas.

Pipe 15 is coupled to Ar gas source 12. A carbon powder hopper 16 and a chromium powder hopper 17 are arranged midway along pipe 15. Valve 18 is arranged at the bottom of hopper 16 and couples hopper 16 to pipe 15, to control the amount of carbon supplied thereto. Similarly, valve 19 is arranged at the bottom of hopper 17, coupling it to pipe 15. Valve 19 controls the amount of chromium ore supplied to pipe 15.

In arc-heating molten steel with the arc process, Ar gas is sprayed from porous plugs 13 and, at the same time, molten steel 3 is tapped from a converter to ladle 1. Electrode 5 is inserted in the ladle and is energized to form an arc between itself and molten steel 3. The molten steel is thus heated with the arc. At the same time, Ar gas is supplied through pipe 15, and valves 18 and 19 of hoppers 16 and 17 are opened to supply a mixture of carbon material and chromium ore at a mole ratio of 3:1, for example, thereto. The carbon and chromium powders are then uniformly mixed by the Ar gas in pipe 15. The powder mixture is carried by the (Ar) carrier gas, and is continuously injected toward molten steel 3 from injection port 8 at the distal and of electrode 5 through gas flow path 7. The powder mixture injected from port 8 reacts due to the heat (2,000° to 3,000° C.) of the arc formed between the electrode and molten steel in the following manner:

$$Cr_2O_3 + 3C \rightarrow 2Cr + 3CO$$

The reaction of the above formula is not easily effected in molten steel at conventional temperatures of 1,600° to 1,700° C. due to a low free energy level, and the reaction rate is low. At such a low temperature, reduction of $Cr_2O_3$ with carbon is impossible in practice. According to this embodiment, however, the arc temperature is 2,000° to 3,000° C., accelerating the above reaction, i.e., allowing easy reduction of $Cr_2O_3$ with carbon.

Figure 8:
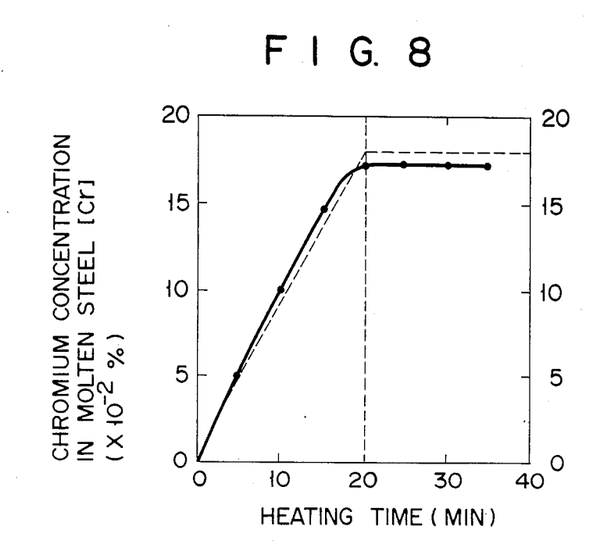
FIGS. 8 and 9 are graphs showing the effect of the third embodiment.

FIG. 8 is a graph showing chromium yield obtained with the above structure. The arc heating time (minutes) is plotted along the abscissa and the concentration [Cr] of chromium in molten steel is plotted along the ordinate. The mole ratio of carbon material to chromium ore was 3:1. A powder mixture of carbon and chromium ore was supplied at a rate of 93 kg/min for 20 minutes. The broken line in FIG. 8 represents changes in chromium concentration in molten steel at 100% yield (i.e., when the amount of Cr entering into the slay is zero). As can be seen from the graph, according to the method of this embodiment, chromium ore can be reduced to add Cr into the molten steel at substantially 100% yield. It was also found that the reaction occurred quickly upon injection of the powder mixture. In addition, it is obvious that the chromium concentration in molten steel can be easily controlled via the amount of powder mixture injected in.

Figure 9:
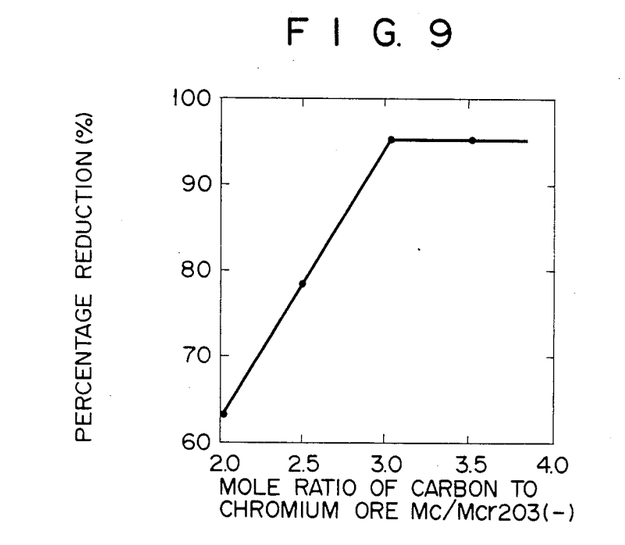

FIG. 9 is a graph showing a percent reduction when the mole ratio of carbon to chromium ore is changed. The mole ratio of carbon to chromium ore is plotted along the abscissa and the percent reduction is plotted along the ordinate. As is apparent from the graph, the percent reduction linearly increases up to a mole ratio of 3.0. However, when the mole ratio exceeds 3.0, the carbon content becomes excessive and the percent reduction thereafter is substantially constant. Therefore, if the mole ratio is set to be 3.0, a substantially 100% percent reduction can be achieved.

In the above embodiment, carbon and chromium ore are independently stored in different hoppers and are mixed in the pipe. However, carbon may be mixed with chromium ore and the resultant mixture may be stored in a single hopper. The carbon and chromium hoppers need not be inserted in series on a single pipe, but can be arranged parallel to each other. In this case, the carrier gas for these different powders is supplied through two different pipes.

According to this embodiment, inexpensive carbon is used in place of expensive Al or Si to reduce chromium ore, thereby adding chromium to molten steel and allowing a reduction in the process cost.

The fourth embodiment of the present invention is described below. In this embodiment, flux for forming slag is mixed in Ar gas and the gas is injected through an electrode. The flux is thus melted to obtain slag by arc heat.

In order to form molten slag on molten steel according to the conventional method, flux is added to molten steel in a ladle, and an arc is formed between electrodes and the molten steel to heat the molten steel and the flux added thereon. The flux is thus melted to form the slag layer on the molten steel. According to another conventional method, flux is heated and melted in another furnace to obtain molten slag, and the slag is then added into the ladle.

According to the former method, the lower portion of the flux layer is easily heated and melted. However, it takes a long time to melt the upper portion of the flux. It took about 20 minutes to melt all the flux using the conventional method. Since the conventional arc process time is 40 minutes, half of the total process time is consumed by melting flux. Therefore, desulfurization time is not enough, shorteleading to low deoxidation/desulfurization efficiency. When an alloy for adjusting the steel component is added to molten steel before the slag material is completely melted, the molten steel components vary undesirably. Using the latter method of melting the flux in a different furnace, an adequate slagging state can be maintained, but only at high cost. The fourth embodiment can also solve the above problems.

The fourth embodiment of the present invention will be described in detail with reference to the accompanying drawings. The same reference numerals in FIG. 10 denote the same parts as in FIG. 1, and a detailed description thereof will be omitted.

Figure 10:
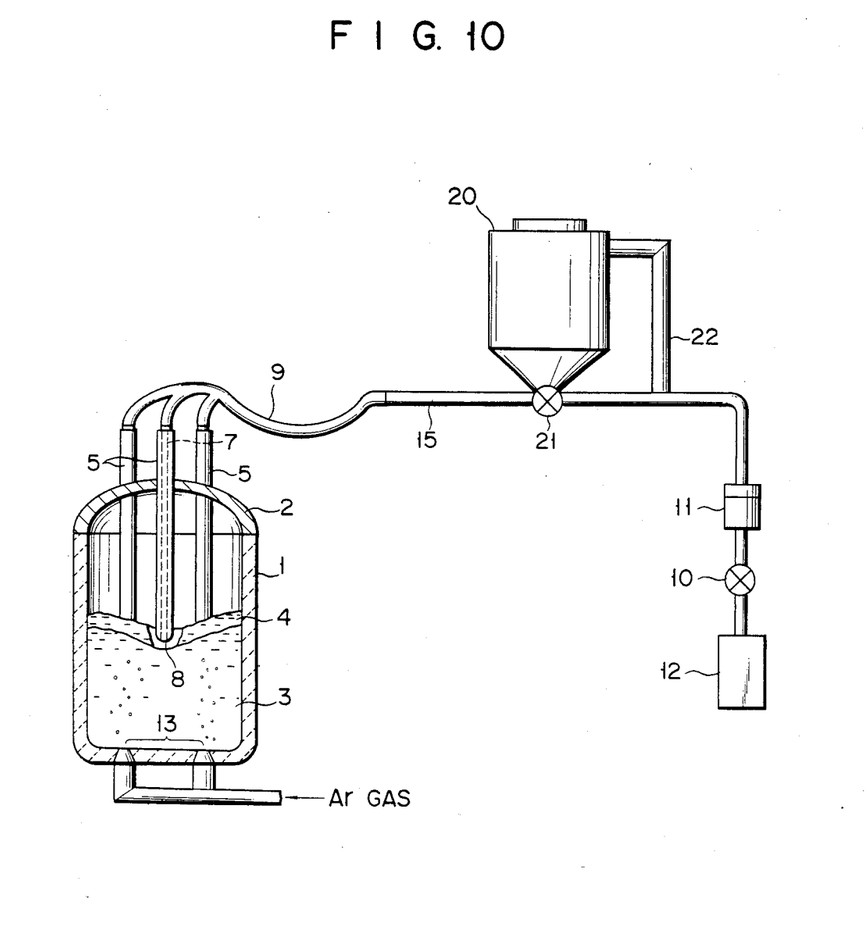
FIG. 10 is a schematic view showing a fourth embodiment of the present invention.

One end of hose 9 is connected to the upper end of electrode 5. The other end of hose 9 is connected to pipe 15 for supplying a slag material carried by Ar gas. Pipe 15 is connected to Ar gas source 12. The bottom portion of hopper 20 for storing a flux powder is coupled midway along pipe 15. Valve 21 is arranged at the bottom portion of hopper 20 to control the amount of the flux supplied to pipe 15. Valve 21 couples hopper 20 to pipe 15. Bypass 22 is formed between the upper portion of hopper 20 and the upstream portion of pipe 15 with respect to valve 21. Bypass 22 prevents a decrease in internal pressure of hopper 20 when the slag material is supplied from hopper 20.

When arc-heating molten steel using the arc process described above, Ar gas is injected from porous plugs 13 and, at the same time, molten steel 3 is tapped from a converter into a ladle 1. Electrode 5 is inserted into the ladle.

Electrode 5 is energized to form an arc between electrode 5 and molten steel 3, thereby arc-heating molten steel 3.

Upon energizing electrode 5, Ar gas as a carrier gas is supplied to pipe 15, and valve 21 of the hopper is opened to supply the flux powder to gas flow path 7. The flux is carried by the Ar gas and is continuously injected from injection port 8 at the distal end of electrode 5 through path 7 toward molten steel 3.

The flux powder injected from the distal end of the electrode is quickly melted and slagged by the heat (2,000° to 3,000° C.) of the arc formed between the electrode and the molten steel, and by the heat of the molten steel. The slag is dispersed in the molten steel by the injection energy of the electrode, and is spread from the electrode region to form a slag layer on the molten steel.

According to this embodiment, the slag layer is immediately formed on the molten steel. At the same time, the heat from the molten steel and the arc process are utilized to melt the flux without requiring additional heating, thus reducing the process cost. Since the flux can be immediately slagged, desulfurization speed and rate upon the reaction between the slag and the molten steel can be improved.

The effect of this embodiment will be described with reference to FIGS. 11 and 12. Flux powder (CaO of 200 meshes) was supplied to molten steel tapped from a 290-ton converter at a rate of 60 kg/min for 10 minutes. The electrode was hollow, having a gas flow path diameter of 20 mm. Ar gas was supplied at a rate of 500 l/min and a pressure of 5 kg/cm$^3$. The results are indicated by black dots. For the purpose of comparison, the flux was added onto the molten steel to melt it by the heat of the molten steel, according to the conventional method. The results are indicated by white dots.

Figure 11:
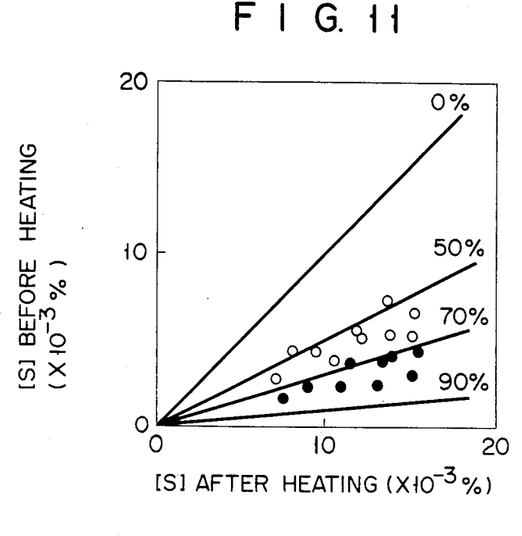
FIGS. 11 and 12 are graphs showing the effect of the fourth embodiment.

FIG. 11 is a graph showing the desulfurization rate. The concentration [S] of sulfur in molten steel prior to arc heating is plotted along the abscissa and the concentration [S] of sulfur after arc heating is plotted along the ordinate. As is apparent from this graph, according to the conventional method (white dots), the desulfurization rate was 50 to 60%. However, the method of this embodiment provided a desulfurization rate of 70 to 80%.

Figure 12:
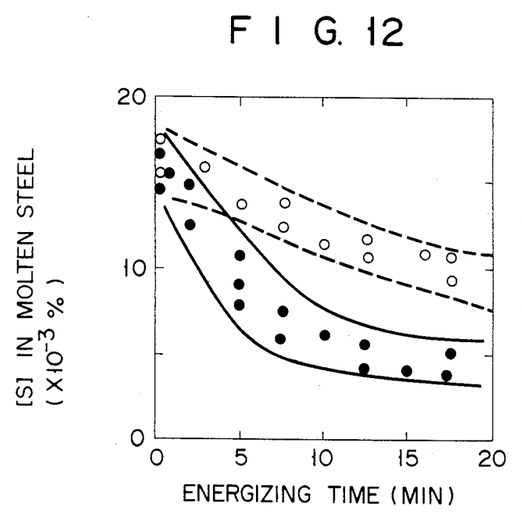

FIG. 12 is a graph showing the slagging rate of the slag material. The energizing time of the electrode is plotted along the abscissa and the sulfur concentration [S] in molten steel is plotted along the ordinate. Using the conventional method (white dots), the concentration [S] was decreased to about $10 \times 10^{-3}\%$ within 20 minutes of energizing. However, according to this embodiment (black dots), the concentration was decreased to about $10 \times 10^{-3}\%$ within about 5 minutes, and to about 5 to $7 \times 10^{-3}\%$ within 10 minutes. In FIG. 12, if the region between solid lines according to this embodiment is compared with the region between broken lines according to the conventional method, the melting rate of flux (indicated by the slope of the region) upon energizing the electrode is improved by about 30%.

According to this embodiment, therefore, the flux is melted immediately to obtain a high desulfurization rate. The flux need not be slagged in a separate furnace or maintained at a predetermined temperature, and slagging can be performed by utilizing the heat in the ladle, resulting in a low process cost.

What is claimed is:

1. A method of heating molten steel by an arc process, comprising the steps of:
    dipping a lower end portion of an electrode into slag on molten steel contained in a ladle;
    energizing the electrode to form an arc between the electrode and the molten steel, the electrode having a gas injection port formed at the lower end thereof, a gas inlet port at the upper portion thereof, and a gas flow path connecting the gas injection port with the gas inlet port; and
    supplying an inert gas from gas supply means to the gas inlet port of the electrode and injecting the inert gas from the gas injection port through the gas flow path.

2. A method according to claim 1, wherein the inert gas is injected from the gas injection port at a rate of not less than 18 Nm$^3$/h per electrode.

3. A method according to claim 1, wherein the electrode is made of carbon.

4. A method according to claim 1, wherein the inert gas injected from the gas injection port is decreased as refining proceeds and the amount of slag increases.

5. A method according to claim 4, wherein the inert gas is injected from the gas injection port at a rate of 21 Nm$^3$/h per electrode in an initial period of refining and at 6 Nm$^3$/h per electrode at the end of refining, the rate of inert gas injected from the gas injection port being decreased as refining proceeds.

6. A method according to claim 1, wherein a powder mixture of chromium ore and carbon material is added to the inert gas and the inert gas, as a carrier gas for the powder mixture, is injected from the gas injection port.

7. A method according to claim 6, wherein a mole ratio of carbon material to chromium ore is more than 3.

8. A method according to claim 1, wherein a flux powder is added to the inert gas and the inert gas carrying the flux powder is injected from the gas injection port.

* * * * *